Nov. 5, 1946.                    M. A. POWERS                    2,410,744
                                 PLASTIC PRODUCT
                          Original Filed Nov. 10, 1938
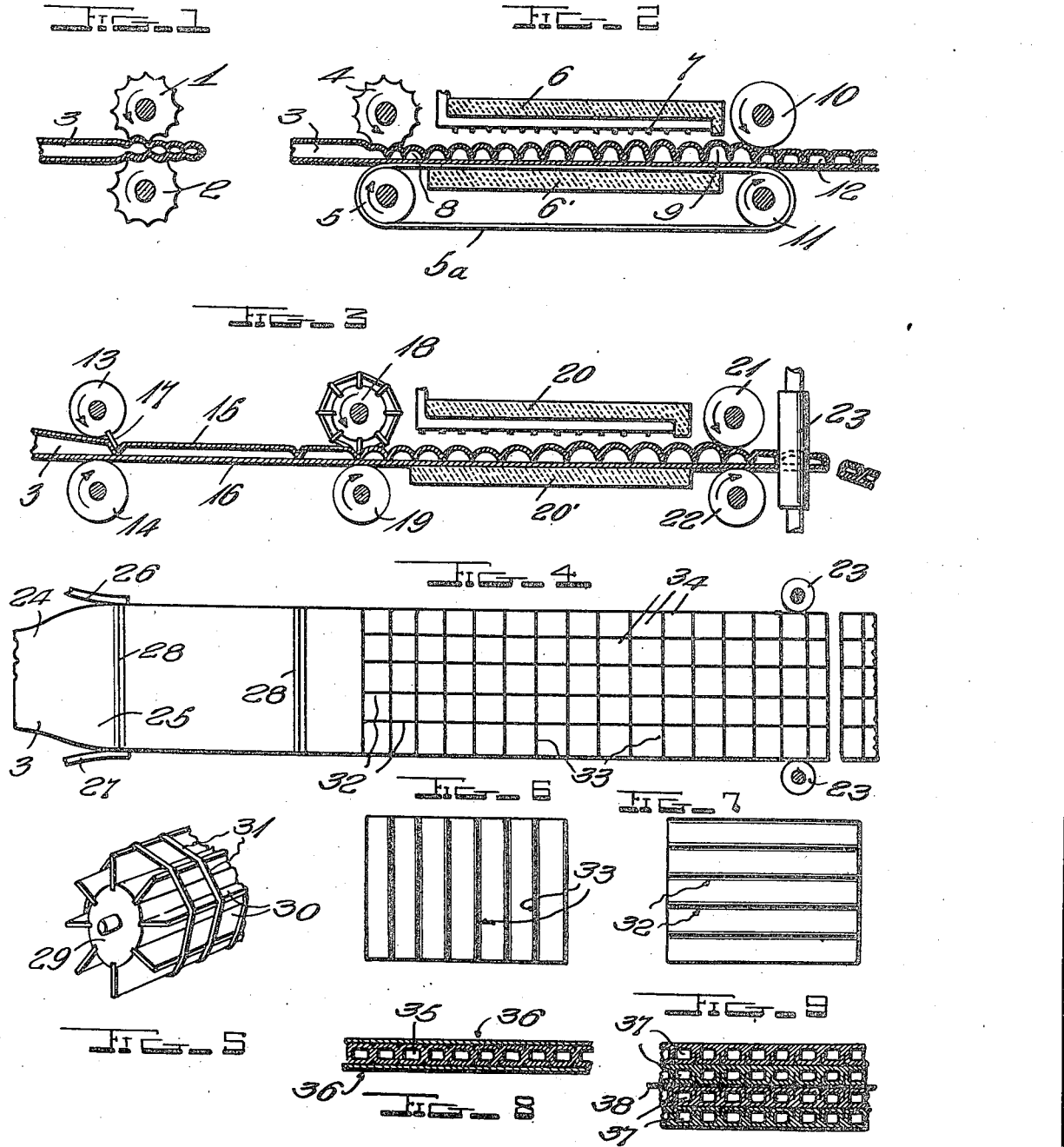
INVENTOR.
MILTON A. POWERS,
BY
Ralph L. Stevens
ATTORNEY Patented Nov. 5, 1946

2,410,744

UNITED STATES PATENT OFFICE 2,410,744

PLASTIC PRODUCT

Milton A. Powers, Detroit, Mich.

Original application November 10, 1938, Serial No. 239,859, now Patent No. 2,316,749, dated April 13, 1943. Divided and this application April 12, 1943, Serial No. 482,762

5 Claims. (Cl. 154—45)

This invention relates to plastic products of special form particularly adapted for use in building construction but also adapted for any other applications where their special qualities make them useful.

My invention also includes the manufacture and assembly of the various forms by some of the processes claimed in an earlier application, Serial No. 239,859, filed November 10, 1938, now Patent No. 2,316,749, dated April 13, 1943, of which this is a division.

One of the principal objects is to provide plastic products of formed cellular construction for use where a strong material, of light weight, of good heat insulating ability, and capacity to transmit light is desired. Other advantages will become apparent as the disclosure progresses, and any one or more of these desirable properties may make the product particularly advantageous for a specific use.

The application just identified is in turn a continuation in part of my application #49,265, filed November 11, 1935 (now Patent No. 2,187,432, granted January 16, 1940). The present application describes variations in the methods of the Patent No. 2,187,432, and claims a new series of products resulting from improved described methods.

An important object is to manufacture a number of plastic products of glass or the like in large volume by automatic methods, which, due to the low cost of both the raw material and fabrication, result in final products whose cost makes them attractive for use on a large scale.

Another object is to produce a glass material which will be of good insulating quality and readily adapted for use as an improvement over double-pane window constructions.

Yet another object is to provide a glass building block of light weight and great strength finding ready use for both load bearing outside walls and for partition walls where light transmission is desired. Furthermore, by special assembly methods numerous colored lighting effects and filtering actions are practical, while at the same time minimum heat transmission is possible.

The foregoing and further objects of the invention will appear upon a study of the following detailed description when taken in conjunction with the accompanying drawing and the appended claims.

Referring now to the drawing wherein like numerals are employed to designate like parts wherever they occur:

Figure 1 is a partially sectioned side view of a tube of plastic such as glass in soft heated condition passing between the imprinting rolls of my process in its simplest form to produce a rope-like product.

Figure 2 is a similar view of a soft heated glass tube passing thru a set of imprinting rolls, thence thru a reexpansion furnace and thence through some sizing rolls which bring the product to finished form.

Figure 3 is another similar view in which still further apparatus has been added for operating upon a tube of large diameter to produce a sheet-like cellular product.

Figure 4 is a top plan view of the material of Fig. 3 during processing, some of the apparatus being removed for clarity of illustration.

Figure 5 is a perspective part view of one form of an imprinting roll as used in the process shown in Figures 3 and 4.

Figure 6 is a plan view of one form of the imprinted product, having transversely sealed passages.

Figure 7 is a plan view of another form of the product, in which the passages are lengthwise disposed.

Figure 8 is a section view of a product assembled from my special imprinted material sealed between two parallel sheets of the same or similar material.

Figure 9 is a section view intended to illustrate another of the many desirable combinations possible—consisting in this case of a unit comprising grouped layers of imprinted plastic material separated by a special dividing wall.

In all instances the basic material supplied for my products preferably consists of newly formed plastic tubing, introduced to the apparatus while still in its soft heated state. A suitable method for producing such tubing is disclosed in my Patent No. 2,187,432, wherein molten glass is discharged downward from an orifice and over a hollow mandril thru which a suitable gas is simultaneously supplied to form and fill the hollow tubing. However, my present invention is not limited to this alone but may also be practiced in conjunction with the Danner tubing machine or the Fourcault process, due attention being paid, of course, to the particular requirements of each process in relation to the direction in which the glass flows from the tubing machine. Where immediately adjoining location of tube and fabrication processes is not feasible, reheating to the proper entry temperature will be necessary. In most cases I start with tubing of proper dimensions and viscosity, preferably continuously supplied, and containing air or gas or condensable vapor. Henceforth, the term "gas" is used to include all suitable substances of non-liquid or non-solid form, which may enter the tubing either with or without preliminary heating, depending upon the nature of the gas and the character of the plastic material.

In Figure 1 two imprinting wheels 1 and 2 are rotating as shown with each wheel so geared to the other as to cause them to operate in unison with the opposing teeth in each wheel tending to touch tip to tip. However, this is prevented by the intervening soft glass tubing 3 which contains gas or vapor, the mutually directed force between the two wheels being sufficient to seal the opposite sides of the tube together, yet not strong enough to cut off the tubing into sections. Thus we have the same basic mechanism and process disclosed in Patent No. 2,187,437, the chief difference being that here the sealed containers are not sheared apart. In fact, during the development of the original process I was successful in producing continuous lengths of sealed glass pillows, the potential value of which impressed me at the time, and which are now fully developed as hereafter described.

The product of Figure 1 as mentioned is a more or less rope-like series of attached "pillows." The pressure between imprinter blades is enough to unite the soft glass of the opposing walls of the tube, but not sufficient to crack or shatter the glass itself. Thus each sealed pillow is free from possible leakage to the atmosphere or to its adjoining likeness. By using steam or some similar condensing vapor as fully described in my earlier application, maximum vacuum at normal temperatures is obtained although good partial vacuums are likewise produced due to the contraction upon cooling of air or other gases.

Now referring to Figure 2, the same soft glass tubing 3 enters the imprinting rolls 4 and 5 which rotate in unison. However, while roll 4 is similar in construction to the rolls of Figure 1, roll 5 in this case is smooth, and thus leaves only a flat smooth surface on its side of the tubing. The imprint of roll 4 is such that the full downward deflection in the soft glass is made by it, thus producing a series of flat bottomed pillows with upwardly rounded tops. As a supporting aid to transporting the soft glass in its partly fabricated form a continuous belt 5a rotates with the imprinting roll 5 and also passes over sizing roll 11. While this belt is desirable it is not essential to the working of the process.

The continuous series of pillows have a certain height, with a fixed volume of gas sealed inside each. It will be readily apparent that the pressure of the gas was the force which caused the pillows to bulge upward between the blades of the imprinting roll, otherwise the two sides of the tubing would have tended to become flattened together. However, depending upon conditions at the moment of forming of the pillow a certain definite amount of gas is trapped therein. If the pillows are allowed to cool the gas pressure drops with the decrease in temperature. However, it may be desirable to increase the volume of each pillow in order to procure a better formed final product having thinner walls.

Therefore, still referring to Figure 2, the pillowed tubing enters a reheating furnace 6—6' supplied with a suitable heat source such as the extended gas burner 7. Immediately the glass absorbs heat, its viscosity decreases and concurrently the pressure of the gas inside increases, due to the rise in its temperature. As the glass is becoming softer and the gas pressure higher, there is an immediate increase in the size of the pillow. In other words, the pillows puff up very materially depending upon the exact temperature conditions impressed upon them. When this method is applied with care, the volume of the pillows can be doubled under closely controlled temperature and timing conditions.

However, great care must be exercised to prevent overheating, which will rapidly change success to failure in this part of the process. Continued heating after maximum reexpansion has been obtained further softens the glass. As the glass becomes more fluid the rapidly increasing force of surface tension tends to draw the walls together and decrease the size of the pillow. Under these circumstances the internal gas pressure is increasingly less than the contracting force of surface tension and the pillow takes on a spherical shape and becomes smaller. But, as a matter of fact this part of the process is important and valuable for producing individual capsules as in my Patent No. 2,187,432. It is an excellent method for producing hollow spheres in volume at low cost, successful practice further depending upon continuous motion of the separated individual capsules, somewhat like popping corn, to promote even heating and to prevent sticking.

In Figure 2 the entering pillows at 8 are seen to increase in volume as they progress through the furnace until they reach the desired maximum size at 9. At this point they leave the furnace and enter a pair of sizing rolls 10 and 11. The position of these rolls determines the thickness of the pillows and at the same time the flattening action of roll 10 depresses the curved tops to produce a substantially flat top surface. During this time the gas pressure inside expands the side walls of the pillows until they approach parallelism and contact, each with its neighbor. This produces a sized product 12 of superior strength and usefulness. The continuous flow of pillows may be broken to any desired length and assembled in any one of the variety of forms to be described later. As an aid to separation at regular intervals, imprinter 4 can be arranged with one or more sharp imprint blades which will weaken the continuous length at regular intervals to assist in separation by breakage upon discharge and cooling.

In Figures 3 and 4 are shown important variations in my processes. Here the entering tubing 3 is relatively large in diameter. Flattening by rolls 13 and 14 produces parallel top and bottom walls 15 and 16 respectively, but because of the greater initial diameter the transverse distance is large. For example, a seven inch diameter tube at 3 will produce a flat section coming from rolls 13 and 14 approximately twelve inches wide.

For the moment we will consider roll 13 as perfectly smooth, disregarding blade 17. In such case the remainder of the process basically duplicates the process described in Figure 2. However, we now have a very wide and relatively poorly supported top wall 15 in comparison with the top wall passing under imprint roll 4 of Figure 2 which has two nearby side walls, being formed of smaller diameter tubing. Such being the case it is evident that the imprinter 18 will tend to drop top wall 15 against wall 16.

To prevent this, roller 13 is provided with an imprint blade 17 which at relatively long intervals seals the glass into gas tight sections. It is apparent that the gas trapped in each section has no possibility of escape and therefore must use its space requirements to bell the pillows upward between the blades of the imprint roll 18. To take full advantage of this action there must always be an intervening sealing wall between the blades of imprint roll 18 and roll 13, which means that they must be spaced some little distance apart.

In order to take full advantage of the supporting strength of the side walls of the tube 3 it may be found preferable to apply imprint blade 17 (without the roller) to the glass in circular section and later apply a sizing roll such as 13 to bring the walls into spaced parallel relationship. Thus the flattening action of the imprint blade and roller do not occur simultaneously and better results may be obtained.

It may be found desirable to reheat the glass between rolls 13 and 18. Further, of course, in all cases the various rolls are interlocked so they rotate in unison. Thus the blades of 18 can be arranged to coincide with the impression of blade 17. Furthermore, a blade such as 17 can be arranged to weaken the product at intervals to give spaced separation upon discharge.

Now referring to Figure 4, in connection with Figure 3, we see a plan view of the glass in process, the elements 13, 18, 20 and 21 having been removed for clarity. As the tube 3 flattens it widens as shown between points 24 and 25. Side guides 26 and 27 (which might also be rolls) hold the proper width and center the glass. Imprint blade 17 leaves imprints 28 while roll 18 leaves a series of sealing imprints 32 and 33. These imprints are lengthwise and crosswise, respectively, leaving a surface of raised square "pillows" 34. These then pass through the reexpansion process in furnace 20—20'. Following this they go between sizing rolls 21 and 22 and edge sizing rolls 23.

Imprint roll 18 is better illustrated in Figure 5, which shows a smooth roll 29 with radially extending thin blades 30 along the circumference of the roll. At right angles are a plurality of spaced wire blades 31, with outer edges of blades and wires at the same radial distance. This construction produces a light weight imprinter of relatively low cost which does not chill the glass excessively yet cools rapidly between imprints. Of course the imprint rolls may be constructed to produce a wide variety of surface appearances and this description is merely intended to illustrate one pattern and one possible construction.

Another form of material is illustrated in Figure 6 as produced by an imprint wheel like Figure 5, but without the blades 31. Here the sealed spaces within the glass extend the full width of the material with closed ends. If an imprint roll like Figure 5, but lacking the blades 30 is used, we will form material as shown in Figure 7 with continuous raised surfaces sealed between the lines 32. Other forms may be desired for certain applications and are readily obtained.

It might be mentioned here that it is possible to vary the glass thickness of different points in the glass at will. For example, application of additional heat to the top of the tube, at 3 will result in a thinner top wall and a thicker bottom wall as the glass becomes flattened. The same principle can be applied at other points in the process, if desirable.

Let us consider, for example, that the glass discharged has a width of twelve inches, a height of one-half inch, and breaks into twelve inch lengths. By taking two panes of window or plate glass twelve inches square and cementing or otherwise attaching them on either surface of the processed section, we have a new glass product as shown in section in Figure 8, where 35 is the special center with 36 the outer panes. This product will find ready application as heat insulating glass for use in window frames where high optical transparency is not required. It has the further distinct advantage of being structurally strong, and not subject to the moisture condensation problems of the usual two pane construction.

By taking four processed sections 37 as shown in Figure 9 and sealing them into a single unit we have a fine quality glass block of great strength and excellent insulating quality. If desired one or more outer panes of smooth glass may be added (not shown). Furthermore, as shown in Figure 9 we may incorporate a thin member 38 which can be of colored transparent material; for example, a pane of red glass, or blue transparent pyroxylin plastic, with or without ornamentation, or any one of a numerous group of variations. It may be a sheet of reflective aluminum foil and, of course, may be applied in the center, at any level through the glass assembly or on the outer surface. Furthermore, of course, one or more of the processed sections may be made of a special kind or color of glass for producing special scenic effects.

While one general type of process has been described as preferable, variations are practicable and may in some circumstances be advantageous. For example, instead of mounting the single sealing imprint blade in a rotating member, the same result may be accomplished by providing a reciprocating mount whereby the blade is depressed to seal the section while advancing with the moving glass, later to rise and return for the next sealing operation.

Likewise the multiple imprinter may have the same motion, serving to seal all of the "pillows" in the section simultaneously. This action furthermore has the advantage of maintaining equal gas pressure in all "pillows" and consequently tends to make for a more symmetrical final product. Where this particular method of procedure is adopted, the subsequent reexpansion described earlier may not be necessary. Furthermore, a flattening action may also be obtained in the imprinting mechanism by providing a limiting back plate on the imprinter to prevent excessive expansion. This member may make unnecessary the use of the final sizing and flattening roll.

The final product also may be assembled as a multiplicity of layers held together by a suitable cementing material such as sodium silicate, Glyptal resin, methyl methacrylate resin, Bakelite, or latex. Adhesion may also be obtained by sintering at softening temperature of the glass, but while this method will make a rigid product it has the distinct disadvantage of requiring a long annealing period to reduce strains. The earlier mentioned cements, while possibly subject to deterioration if exposed to atmospheric conditions, are in this case well protected. Furthermore, they act somewhat as a resilient buffer between layers and thus decrease cracking and provide greater total strength.

It should be understood that many variations may be made within the spirit of the invention and the scope of the appended claims. Among some of the obvious changes are the substitutions of various suitable synthetic plastics for glass and for one another in the products described above. For example, a material known as "Saran," a thermoplastic formed by copolymerization of vinylidene and vinyl chlorides, has been tried and found suitable for the manufacture of capsules and groups of attached pillows.

What is claimed is:

1. In a product formed from molten glass tubing, a plurality of hollow pillow-shaped elements joined together by substantially full surface fusion of their contiguous mated edges and sealed apart by these surfaces of joinder, said pillows having substantially flat side surfaces and substantially flattened edges.

2. A product of the character described, comprising a group of hollow thin-walled elements formed of plastic material and fused together along their surfaces of contact, the external surfaces of the grouped elements being flattened at their sides and their edges and each element containing gas at low pressure and sealed to itself.

3. A product formed from softened glass material, comprising a plurality of elongated hollow pillows arranged side by side substantially in parallelism, joined together at their side surfaces and sealed apart by fusion of said side surfaces, and also sealed to the surrounding atmosphere.

4. A hollow envelope of plastic material, in the form of two substantially parallel walls, divided into a multiplicity of sealed cell units arranged in rows by a selected pattern of parallel lines which correspond to compression lines of sealing contact between the two main walls of the envelope.

5. A product comprising a pair of slab-like cellular sheets of light-transmitting plastic material, each consisting of at least one layer and each layer embodying a multiplicity of sealed cells, said sheets being contiguous; and a third sheet, thin and of opaque material disposed between and adhering to said cellular sheets to join them together.

MILTON A. POWERS.